United States Patent [19]

Finzel

[11] Patent Number: 4,762,390
[45] Date of Patent: Aug. 9, 1988

[54] CONNECTOR ELEMENT FOR A PLURALITY OF LIGHT WAVEGUIDES IN A ROW

[75] Inventor: Lothar Finzel, Munich, Fed. Rep. of Germany

[73] Assignee: Siemens Aktiengesellschaft, Berlin and Munich, Fed. Rep. of Germany

[21] Appl. No.: 21,829

[22] Filed: Mar. 4, 1987

[30] Foreign Application Priority Data

Mar. 11, 1986 [DE] Fed. Rep. of Germany ....... 3608053

[51] Int. Cl.$^4$ .............................................. G02B 6/38
[52] U.S. Cl. ................................ 350/96.21; 350/96.22
[58] Field of Search ................... 350/96.2, 96.22, 96.21

[56] References Cited

U.S. PATENT DOCUMENTS 4,657,341  4/1987  Sammueller .................... 350/96.22

FOREIGN PATENT DOCUMENTS 0070810  5/1980  Japan ................................ 350/96.21

Primary Examiner—John Lee
Assistant Examiner—John Ngo
Attorney, Agent, or Firm—Hill, Van Santen, Steadman & Simpson

[57] ABSTRACT

A connector element for a plurality of light waveguides comprising two carrier members, each having a centering groove for the waveguides, and an arrangement for holding two carrier members in abutting relationship with the centering grooves of one carrier aligned with the centering grooves of the other. The arrangement for holding includes a guide groove in each of the members extending parallel to the centering groove along each of the edges of the members, a pair of bridging elements having a ridge for each of the guide grooves, said bridging elements being connected to a common base plate extending therebetween and covering the carrier members.

10 Claims, 2 Drawing Sheets

CONNECTOR ELEMENT FOR A PLURALITY OF LIGHT WAVEGUIDES IN A ROW

CROSS-REFERENCES RELATED TO APPLICATION

This application contains common subject matter that is disclosed in applicant's copending application U.S. Ser. No. 021,686, filed 3/4/87, and U.S. Ser. No. 021,689, filed 3/4/87.

BACKGROUND OF THE INVENTION

The present invention is directed to a connector device or element holding a plurality of light waveguides in an aligned arrangement with a second plurality of light waveguides. The connector device includes a pair of connector plates or carrier members which have a plurality of parallel extending centering grooves and a guide groove adjacent at least one lateral edge, bridging guide elements having a ridge for receiving the guide grooves of two carrier members to hold them in alignment, and fixing means for holding the carrier members and guide elements in an assembled relationship with the waveguides of one carrier member aligned with the waveguides of the other carrier member.

A connector element or device having two carrier members containing guide grooves for waveguides and a fixing device for holding the carrier elements in axial alignment is disclosed in the allowed U.S. patent application, Ser. No. 634,468, filed July 24, 1984, which issued an Apr. 14, 1987, as U.S. Pat. No. 4,657,341 and whose disclosure is incorporated by reference and was based on the application resulting in German OS 34 08 783. As illustrated, profile members were provided as the guide elements and these guide elements and profile members are manufactured in one piece. These profile members yield the precise alignment of the end face of the light waveguide fibers and must, therefore, be manufactured with a high precision.

When a one-piece base plate is employed, which also embraces the two guide elements proceeding laterally at the right and left of the actual splice location, then their mutual allocation must occur such that not only does the cross section of the profile members itself observe the desired shape with a precision requiring a very high tolerance, but also the mutual spacing between the two guide elements and the position of the two elements relative to one another must exhibit a correct value.

SUMMARY OF THE INVENTION

The present invention is based on the object of creating a structure for the connector device which have a precision in the alignment of the light waveguide splice locations and is nonetheless guaranteed without excessively high demand for tolerance.

These objects are obtained by an improvement of a connector device for a plurality of light waveguides, said device comprising two carrier members, each having parallel extending centering grooves with a parting surface extending at right angles to the grooves, each of the carrier members having a guide groove at least adjacent each edge, a bridging guide element for each guide groove of the element to extend between the two carrier members and fixing means for holding the carrier members and guide elements together. The improvement is that the guide elements are secured to a common base member only in sub-areas for each guide element.

Since the guide elements are fashioned as individual component parts and are arranged on a common base plate, the manufacture of the base plate itself can occur without any demands for tolerance. The necessary tolerance values are observed only by the guide elements, and since these are secured to the base plate only in sub-areas, their mutual allocation is largely unproblematical because the free regions lead to a latching in each case. This means that the spacing of the guide elements relative to one another must be set relatively roughly without special tolerance demands, and this represents a corresponding simplification in the manufacture.

It is expedient in this context to fix the guide elements to the base plate only in the very small sub-areas, preferably only at their ends, because practically no forces thereby occur in the splicing region which are essentially located in the middle of the guide elements. The splicing region itself is, thus, not influenced by a potentially not quite exact alignment of the guide elements relative to the associated guide grooves.

Other advantages and objects will be readily apparent from the following description, drawings and claims.

DESCRIPTION OF THE PREFERRED EMBODIMENTS

Figure 1:
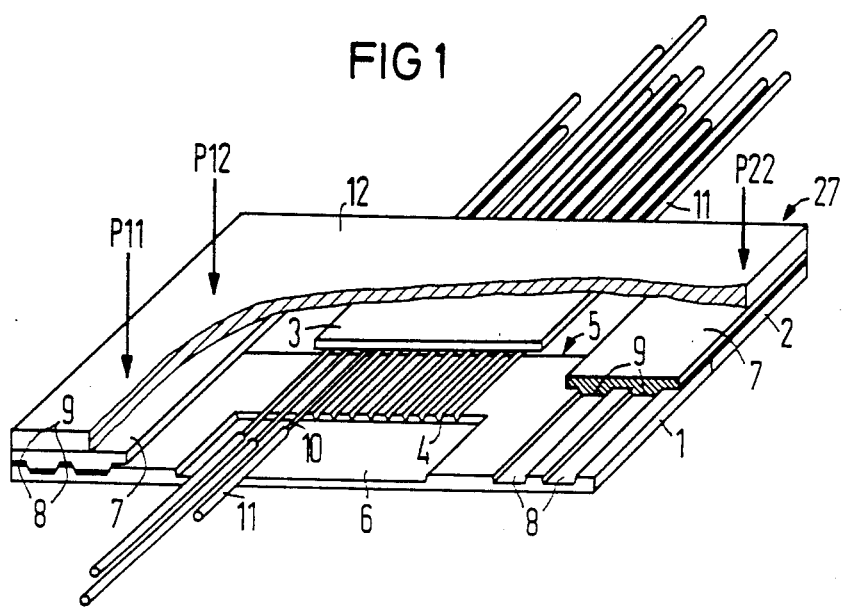
FIG. 1 is a perspective view with portions removed for purposes of illustration of a structure of a connector device in accordance with the present invention.

The principals of the present invention are particularly useful to complete the assembly of parts to form a connector element or device generally indicated at 27 in FIG. 1. The connector device 27 has two carrier members 1 and 2, a base plate 12, which is illustration with parts being broken away in order to make the structure of the inside of the connector device clearly visible.

The two identical carrier members 1 and 2 have their end faces abutting against one another at a common parting location 5. Each of these carrier members 1 and 2, respectively, is advantageously composed of an etchable material such as, for example, silicon, to form centering grooves 4 which have a V-shape in view of the suitable etching method. These centering grooves 4 serve for the acceptance and centering of the stripped light waveguides 10. An etched-out recess 6 is located at the end of the centering groove 4 and this recess extends over the entire width of the group of centering grooves 4 and thus offers space in common for all light waveguides 10 together with their cladding layers 11.

After insertion of the waveguides 10, the centering grooves 4, as well as the recess 6, of every carrier member 1 and 2 are covered by a respective cover plate 3 after the insertion of the light waveguides 10 into the grooves 4 and this cover plate 3 is expediently glued to the particular carrier 1 or 2. In the illustrated embodiment, only a cover plate 3 for the carrier 2 is shown, whereas the cover plate for the carrier member 1 has been omitted. The adhesive, which serves the purpose of fixing the light waveguides 10, is introduced proceeding from the end face 5 of the carrier member 1 or 2, respectively. As a consequence of capillary action in the centering grooves 4 and due to the narrow gap betwen the cover plate 3 and the carrier member 1 or 2, respectively, the adhesive penetrates into the inside and, thus, glues the carrier member, cover plate and light waveguides to one another. The recess 6 is subsequently expediently likewise filled with adhesive material. After joining the members, waveguides and cover plates together, the unit is then ground and polished on its end face to form the parting location or surface 5. As illustrated, twelve grooves 4 are arranged side-by-side, for example, for a connector arrangement and these twelve centering grooves 4 proceed parallel to one another in the example at a mutual spacing of 0.5 mm. The length of the centering grooves 4 amount to approximately 5 mm.

Figure 2:
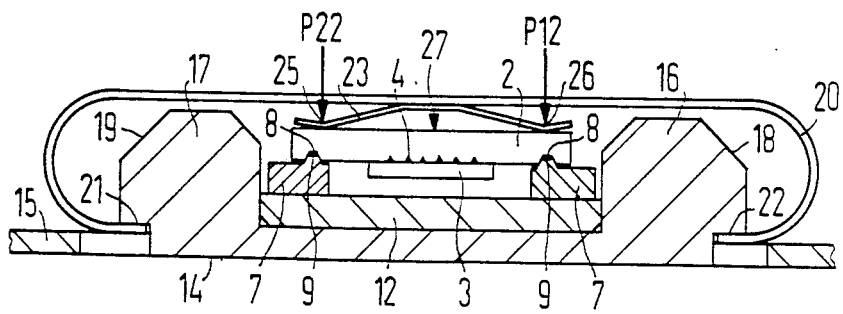
FIG. 2 is a cross sectional view taken in the plane of the abutting surfaces of the carrier elements of the connector in accordance with the present invention.
Figure 4:
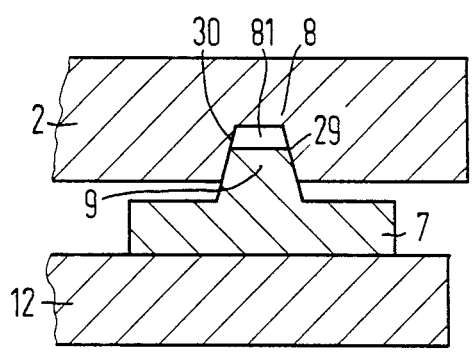
FIG. 4 is an enlarged partial cross sectional view of the ridge of the profile member being engaged in a guide groove of one of the carrier plates.

Auxiliary grooves 8, which, like the centering grooves 4, are etched and which proceed parallel to the latter, are adjacent each of the two lateral edges of the carrier members 1 and 2 and outside of the area covered by the cover plate 3. At least one auxiliary groove is provided on each side edge; two are shown in the embodiment of FIG. 1, while only one is shown in the embodiment of FIG. 2. These auxiliary grooves 8 serve the purpose of aligning the two equipped carrier members 1 and 2 by coacting with guide elements 7 having matched, correspondingly salient profiles or ridges 9 which are inserted into these auxiliary grooves 8. The guide elements 7 bridge the common parting location 5 so that both the carrier members 1 and 2 and, thus, the centering grooves 4 as well, are aligned in alignment with one another. The guide elements 7 are secured to a common base plate 12, which covers the entire splice connector. As best illustrated in FIG. 4, the auxiliary grooves 8 are expediently of a trapezoidal cross section and are matched to the trapezoidal profiles 9 of the guide elements 7 so that the contacting occurs only along the two lateral surfaces of each of the profiles or ridges 9. The ridges 9, as well as the grooves 8 are situated laterally at some distance from the centering grooves 4 in order to prevent moistening with the adhesive. An extremely high precision for the overall connector arrangement can be achieved by the common etching and subsequent parting of the two carrier members 1 and 2. The carrier members 1 or, respectively, 2 have dimension of about 8–9 mm given a thickness of about 0.5 mm. The cover plates 3, which are likewise composed of etchable materials such as, for example, silicon, are divided into two zones at their insides. The one zone lies planarly against the carrier member 1 or, respectively 2, and presses the stripped waveguides 10 into the centering grooves 4. The other zone is provided with a recess which covers the portion of the light waveguide that still have the jackets which are still received in the recess 6. The dimension of the cover plate amount, for example, 4–8 mm, whereby the thickness amounts to about 0.5 mm, for example in the region of the uncoated light waveguides, and amounts to about 0.3 mm in the region having the recess that overlies the recess 6.

When a releasable connection between the two carrier members 1 and 2, as well as between the guide elements 7 secured to the base plate 12 is desired, compression forces, which press these parts against one another must be provided. When a firmer pressing power is obtained, a better alignment between the parts is obtained. On the other hand, however, it must be assured that absolutely no twisting or distortion occurs in the region of the abutments of the light waveguide ends when these pressing powers take effect, because the splice attenuation would be increased as a result. The solution of this problem is by applying the compression forces only in area of the guide elements 7 as indicated by the arrows P11, P12, and P22, wherein a fourth force P21 is not illustrated, but it being mirror-inverted relative to the force P11 illustrated in FIG. 1. Since the forces P11, P12, P21, and P22 are only applied in the region of the guide elements 7 to hold the profiles or ridges 9 in the grooves 8, the abutting region in which the end faces of the light waveguides 10 abut one another remains free of forces so that an increase in the attenuation and/or deterioration are avoided in this critical region.

In order to apply the pressing forces as mentioned with regard to the forces P11, P12, P21 and P22 of FIG. 1, a structure illustrated in FIG. 2 is utilized. As illustrated, a connector element of FIG. 1 is shown inverted or turned 180° wherein a section is placed precisely along the parting plane 5. Thus, only the end face of the basic element 2 with the cover plate 3 secured thereto is visible. In a departure from the embodiment of FIG. 1, only one profile or ridge 9 and one groove 8 is provided along each of the edges of the carrier member 2.

The parts of the connector element or device 27 itself are held together in an assembled relationship by fixing means which includes receptacle means 14, which has two lateral edges or ridges 16 and 17 whose inside surfaces form a lateral detent or guide surface for the base plate 12. Each of the ridges 16 and 17 on an outer edge have undercuts 22 and 21, respectively, into which the U-shaped ends of a clamp 20 are engaged. The receptacle means 14 is received in an aperture of a splicing plate 15 which, for example, can be a component part of a splice housing or a sleeve. The clamp 20 is latched into the lateral legs or ridges 16 and 17 of the receptacle means 14, and this latching is facilitated by appropriate bevels such as 18 and 19 on the outside ridges 16 and 17. It should be pointed out that the clamps are expediently provided so that there is a clamp 20 provided for each one of the carrier members 1 and 2.

A spring clip 23 is attached, preferably by spot welding, in the middle part of the clamp 20 and the ends of the spring clip 23, which are bent over somewhat in an upward direction lie against the carrier member 2 at the contact or sealing areas 25 and 26. These seating areas 25 and 26, which actually are seating lines, are selected so that they lie in the region of the guide element 7, namely, preferably in the proximity of the profile 9 and of the auxiliary groove 8. A mechanical pressure corresponding, for example, to the force arrows P12 and P22 is thereby exerted exactly where the groove 8 and the ridge 9 engage to provide the force to align of the two carrier members 1 and 2. With this type of application of the forces, no deformation whatsoever will occur in the inside region of the carrier members 1 and 2, and the alignment of the ends of the light waveguide fibers is not deteriorated in any way whatsoever by the forces exerted by the spring clip 23. It continues to be assured that the sensitive, extremely thin and brittle carrier members 1 and 2, which are usually composed of silicon, are not subject to any bending stresses which would lead to fractures.

The clamp 20 also simultaneously serves for the external protection and for covering the overall splice connection. The spring clip 23 extends at right angles relative to the longitudinal axis of the light waveguides which are accommodated in the centering grooves 4. The transverse extent of the spring clip 23 is expediently selected so that it extends only over a part of the length of the associated carrier member 1 or 2, for example for about 50% of the length of the carrier member. The spring properties of the clamps 20 are expediently selected so that they are significantly stiffer than the respective spring clip 23 so that the spring clip 23 should exhibit a considerable lower spring constant than the clamp 20. It is also expedient in this context to select a softer material for the spring clip 23 and/or a material which is thinner in cross section than for the relatively stiff clamp 20 and/or to make the spring clip 23 less broad than the clamp 20. The spring clip 23 can also be fashioned with slots in the outside region adjacent to the seating locations 25 and 26.

Figure 3:
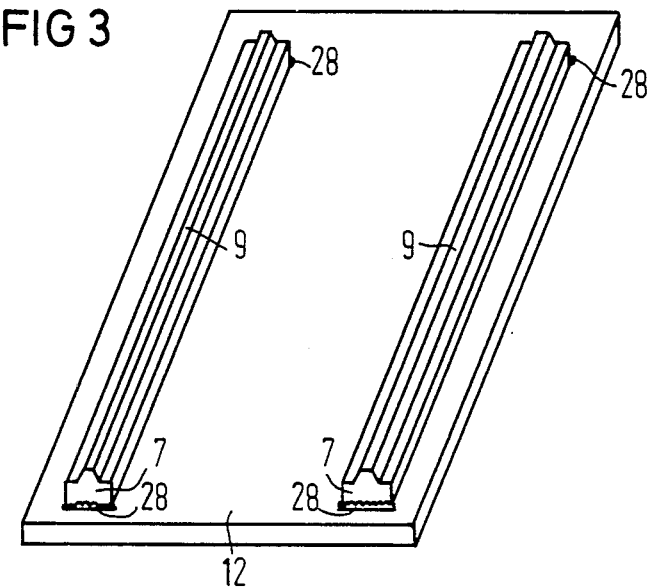
FIG. 3 is a perspective view of the profile members on a base plate.

In order to assure a good alignment and, nonetheless, an optimum low manufacturing cost for the profile members or ridges 9, the guide elements 7 are fixed to a common base 12 only in extremely small sub-areas. This means that the guide element 7 can have laterally displaceable in large areas of its length. Thus, a tolerance compensation is always possible, even when extremely precise allocation of the spacing of the two profile members 7, for example, in the arrangement in FIG. 3 relative to the guide grooves 8 of the carrier members 1 and 2 in accordance, for example, as illustrated in FIG. 2 is not present.

It is additionally assumed in the present example that the guide elements 7 are fixed to the base plate only in their end regions, namely for example, by means of an adhesive whose beads are indicated at 28. An especially soft and elastic adhesive, for example an adhesive sold under the trade name "Silgel Kleber 43" by Wacker Chemie which is a silicone, comes into consideration as an adhesive. A potential lacking of precisions in the spacing of the two profile members 7 can be eliminated in a simple way because of the adhesive. The carrier members 1 and 2 on one hand and the base plate 12 with the guide elements 7 on the other hand are pressed against one another with appropriate firmness, and so that the ridges or profiles 9 are pressed into the proper position because they can escape or move laterally. The profiles or ridges 9 proceed continuously over the full length of the guide element 7 and, as seen in cross section in FIG. 4, have an essentially trapezoidal shape. The upper trapezoidal surface of the profile member 9 is therefore expediently of a height slightly less than the depth of the guide groove 8 and the two are pressed against one another with their lateral surfaces forming a clearance 81 between the top of the ridge 9 and the base of the groove 8. The etched-in auxiliary groove or alignment groove 8 of each of the carrier members 1 and 2 are therefore likewise trapezoidal shaped and the aperture angle of the trapezoids are selected identically in both instances so that their respective lateral surfaces 29 and 30 press against one another with a plane surface contact.

The adhesive for the fastening of the guide elements 7 should be as highly viscous as possible in order to prevent the adhesive from creeping under the guide elements over a large area due to capillary action and in order to prevent these from being fixed to the base plate over excessively large areas.

It is expedient if the adhesive only contacts the lateral end surface of the guide element. Thus, like a hollow weld in welding, only end faces of the guide elements are connected to the base plate by the adhesive.

Although various minor modifications may be suggested by those versed in the art, it should be understood that I wish to employ within the scope of the patent granted hereon, all such modifications as reasonably and properly come within the scope of my contribution to the art.

I claim:

1. In a connector device for a plurality of light waveguides, said device including two carrier members having parallel extending centering grooves for receiving light waveguides and an end surface for abutting a corresponding end surface of a carrier member with the waveguides in an abutting relationship, each of said carrier members having a guiding groove and a bridging guide element having a ridge received in said guiding groove, means for holding the carrier members and the bridging guide elements in an assembled relationship with the abutting surfaces in engagement and the guide elements holding the waveguides in alignment, the improvement comprising a common base plate and the two bridging guide elements and means for securing the two bridging guide elements to the common base plate, said means for securing only securing the elements in selected sub-areas and being an adhesive which remains elastic to allow yielding after securing.

2. In a connector device according to claim 1, wherein the adhesive is only applied to the outer surface of the guide element, preferably in a manner of a hollow weld.

3. In a connector device according to claim 2, wherein the guide elements have a ridge for each groove in the carrier member, said ridges and grooves having a trapezoidal cross section.

4. In a connector device according to claim 1, wherein each of the guide elements has a continuous extending ridge element for being received in corresponding guide grooves in the carrier members.

5. In a connector device according to claim 4, wherein the ridge and groove elements have cross sections selected so that the inside walls of the guide grooves have lateral plane surfaces engaged by lateral plane surfaces of the ridge.

6. In a connector device according to claim 1, wherein the application of the adhesive is only in the end areas of the guide members.

7. In a connector device according to claim 1, wherein the means for securing the guide members onto a common base comprises securing an end face of each of the guide members to the base.

8. In a connector device according to claim 7, wherein the ridge of the guide element is a continuous ridge which engages corresponding guide groove in the carrier members.

9. In a connector device according to claim 8, wherein the cross section of the ridge and the guide grooves are selected with the guide grooves and ridge having planar side walls engaging each other.

10. In a connector device according to claim 9, wherein the cross sectional profile of the guide grooves and ridge are trapezoidal cross sections.

* * * * *